United States Patent [19]

Kuster

[11] 4,316,570
[45] Feb. 23, 1982

[54] APPARATUS FOR FEEDING STRIPS OF RUBBER COMPOSITIONS SIMULTANEOUSLY INTO AN EXTRUDER

[75] Inventor: Howard L. Kuster, Stow, Ohio

[73] Assignee: The B. F. Goodrich Company, Akron, Ohio

[21] Appl. No.: 144,514

[22] Filed: Apr. 28, 1980

[51] Int. Cl.³ ............................................. B65H 17/22
[52] U.S. Cl. .................................................. 226/176
[58] Field of Search ............... 226/176, 177, 178, 179, 226/11; 242/57

[56] References Cited

U.S. PATENT DOCUMENTS

| | | | |
|---|---|---|---|
| 1,946,170 | 2/1934 | Mikaelson | 226/176 |
| 2,320,659 | 6/1943 | Sahlin | 226/176 |
| 3,265,271 | 8/1966 | Cohn | 226/177 |
| 3,665,844 | 5/1972 | Clark | 226/11 |

Primary Examiner—Edward J. McCarthy
Attorney, Agent, or Firm—James R. Lindsay

[57] ABSTRACT

A feeder device is described that causes two or more strips of unvulcanized rubber composition to be fed simultaneously at substantially the same linear rate. The feeder device includes a pair of opposed feed rolls between which the rubber strips are drawn mounted to rotate freely about their respective axis. During operation of the feeder device the feed rolls are urged toward one another but not with sufficient force to cause cutting through of the rubber strips. The rate at which the strips simultaneously advance through the feeder device is determined by the speed at which feed rolls rotate which, in turn, is dependent upon the rate at which at least one of the rubber strips is being advanced.

4 Claims, 4 Drawing Figures

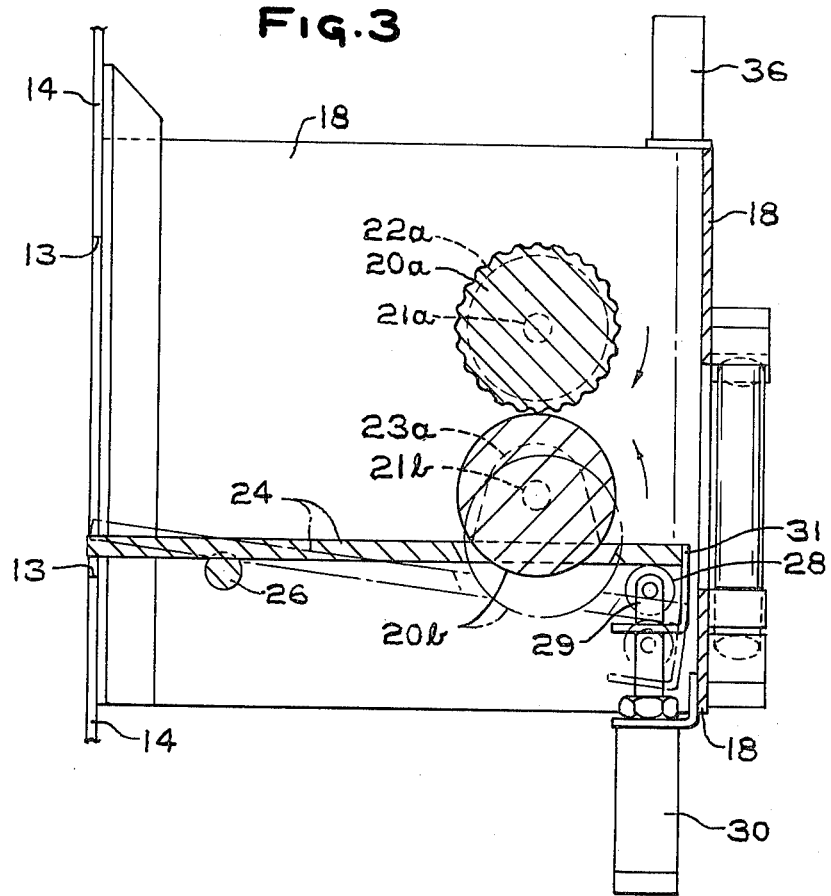
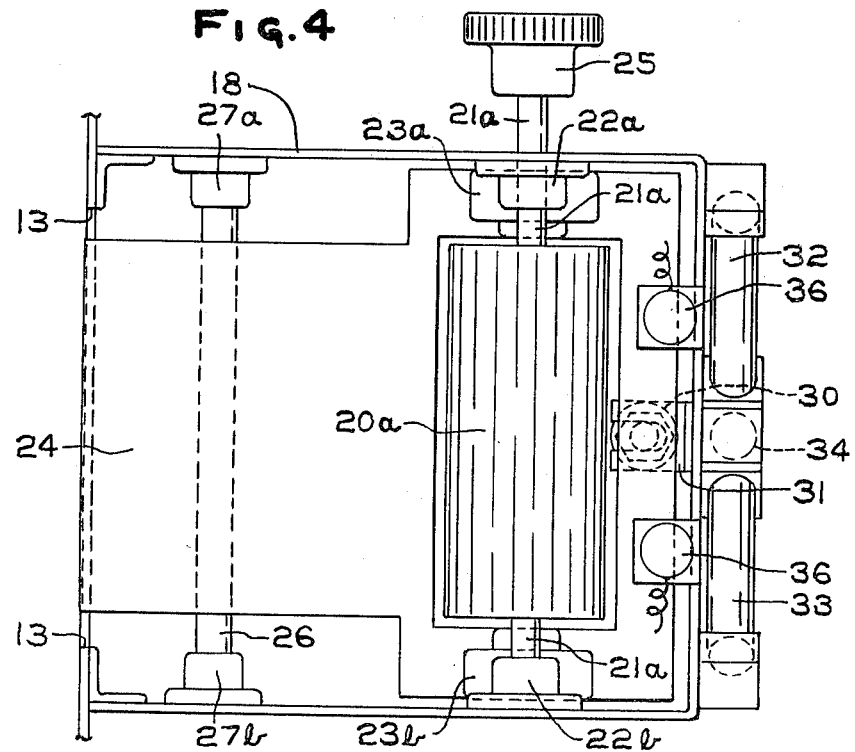

APPARATUS FOR FEEDING STRIPS OF RUBBER COMPOSITIONS SIMULTANEOUSLY INTO AN EXTRUDER

BACKGROUND OF THE INVENTION

The mixing of rubber composition conventionally is done on roll mills or in a Banbury internal mixer. When using roll mills for mixing the rubber composition, the rubber component of the composition is banded on the roll mill and the remaining compounding ingredients are added to the rubber as it is being kneaded on the roll mills. When mixing of a rubber composition is carried out in a Banbury internal mixer, the rubber component of the composition is added to the mixer and the remaining ingredients then are added to the mixer. Mixing continues on the roll mills or within the Banbury internal mixer until the compounding ingredients are substantially uniformly dispersed throughout the rubber matrix.

Sulfur or a sulfur-donor is included in sulfur-vulcanizable rubber compositions to produce chemical crosslinking between rubber polymer chains to form the polymer chains into a stereo-network. The crosslinked rubber polymer product exhibits improved toughness and durability. The rate at which crosslinking occurs (the "cure rate") is extremely slow at room temperature but is increased significantly if the composition is heated. The rate at which crosslinking occurs also can be improved through the use of accelerators of vulcanization that are added to the rubber composition in combination with sulfur or sulfur-donor materials. Further improvement in the cure rate can be achieved through the use of accelerator activators which form chemical complexes with the accelerators that not only benefit the rate at which the rubber composition cures but also may improve the physical or chemical properties of the vulcanized composition.

During the mixing operation, whether mixing of the rubber composition is accomplished on roll mills or in a Banbury internal mixer, a significant heat build-up in the composition is experienced as a result of friction developed during the kneading of the rubber compound of the composition. Prolonged mixing of the ingredients at the elevated temperature will result in "scorching" the composition. ("Scorch" is a premature partial or complete vulcanization of the rubber composition during the mixing operation.) A premature vulcanization of the batch during the mixing operation deminishes the plastic properties of the composition so that it can no longer be processed satisfactorily and results in the batch having to be discarded. Vulcanization of the batch within a Banbury internal mixer not only results in a ruined batch but also often requires a costly clean-up operation to remove the vulcanized batch from the interior of the mixer.

As a consequence of the "scorching" problem, care must be exercised in formulating a rubber composition to avoid "scorching". If accelerators and accelerator activators are included in the composition in order to reduce the cure rate of the composition or for producing desired physical or chemical properties in the vulcanized product, scorching of the batch during mixing is risked. To avoid the risk of scorching, rubber compounders have materially reduced or in some instances entirely eliminated accelerators or accelerator activators from certain formulations, even though to do so resulted in an objectionably long time to reach an optimum vulcanization of the composition and a sacrifice in the physical or chemical properties of the vulcanized product.

In the copending application of Stephen C. Sabo, James Sidles and Jerome J. Blayne entitled "Process For Marking Rubber Articles", Ser. No. 145,167, filed Apr. 30, 1980, a process is described for mixing a rubber composition that normally would have "scorched" if mixed by conventional mixing procedures using roll mills or a Banbury internal mixer. The process involves forming two or more strips of rubber compositions of different formulations. One strip contains the sulfur or a sulfur-donor while the other strip contains an accelerator system for reducing the cure time necessary to fully vulcanize the composition. The strips are fed at essentially an equal rate into an extruder in which the strips are intermingled as the extruder screw carries the compositions toward the extruder discharge head. The intermingling of the separate compositions as they travel through the extruder produces an extrudate that consists of relatively thin juxtapositioned layers or strata of the separate compositions. Migration of the sulfur or sulfur-donor from one stratum to adjacent strata and migration of the accelerator system from one stratum to adjacent strata occurs whereby the extrudate progresses toward a condition of equilibrium equivalent to that which would have resulted if the sulfur or sulfur-donor and accelerator system had been added initially with the rubber polymer of the composition on roll mills or in a Banbury internal mixer but without the danger of scorching.

To achieve an optimum volume mix of the separate strips of rubber composition, the strips must be fed simultaneously into the extruder at substantially equal linear rates. However, if the strips merely are fed into the extruder, relying solely on the extruder screw to draw the separate strips of rubber composition into the extruder, the strips normally are pulled into the extruder at significantly different rates. The present invention provides a feeder device that insures the separate strips of rubber composition are fed into the extruder at substantially the same linear rate to produce an optimum volume mix of the two compositions.

SUMMARY OF THE INVENTION

In accordance with the present invention, separate strips of unvulcanized rubber composition are fed between a pair of opposed generally cylindrical-shaped feed rolls that are mounted to rotate freely about their respective axis. The feed rolls desirably are continually being resiliently urged toward each other during the operation of the feeder device to insure that the strips of rubber composition are firmly engaged by the feed rolls. As the extruder screw draws the strips of rubber compound into the extruder, the advancing strips cause the feed roll to rotate. If one of the strips tends to be drawn into the extruder at a faster rate than the other strip (or strips), the faster moving strip will control the speed at which the feed rolls are rotated. The feed rolls as they rotate will bite into the slower moving strip (or strips) and cause the slower moving strip (or strips) to be advanced into the extruder at essentially the same linear rate as the said strip that is controlling the rate at which the feed rolls are rotating.

DESCRIPTION OF THE DRAWINGS

FIG. 3 is a section taken on line 3—3 of FIG. 2; and

FIG. 4 is a plan view of the feeder device shown in FIG. 2.

DETAILED DESCRIPTION OF THE INVENTION

Figure 1:
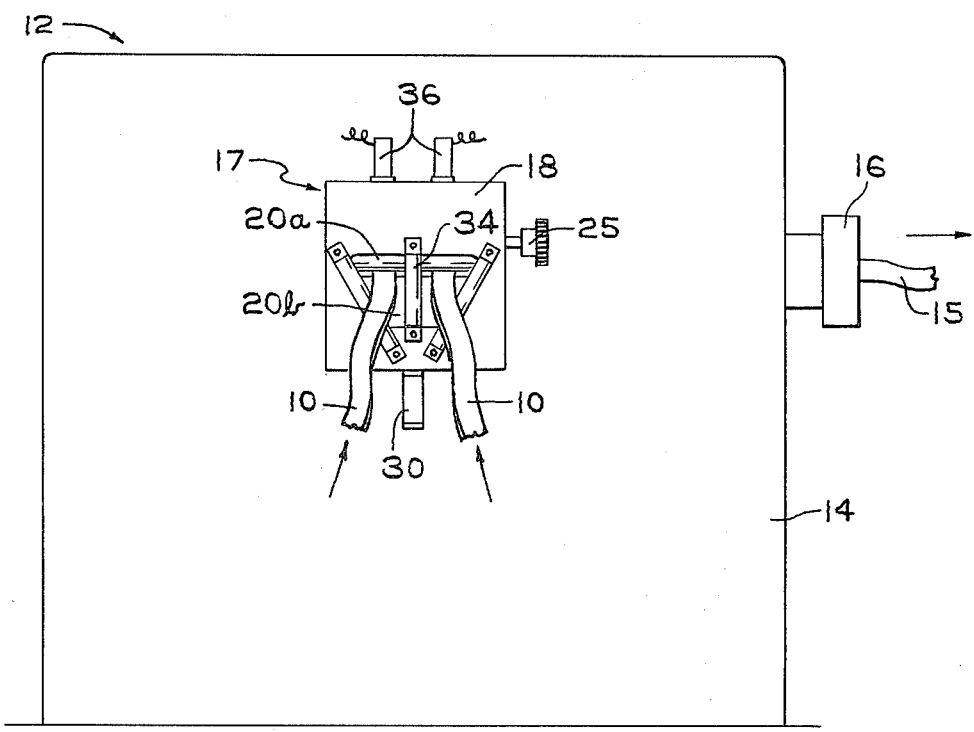
FIG. 1 is a schematic elevation view of a screw-type extruder showing a feeder device within the purview of this invention associated with the extruder.
Figure 2:
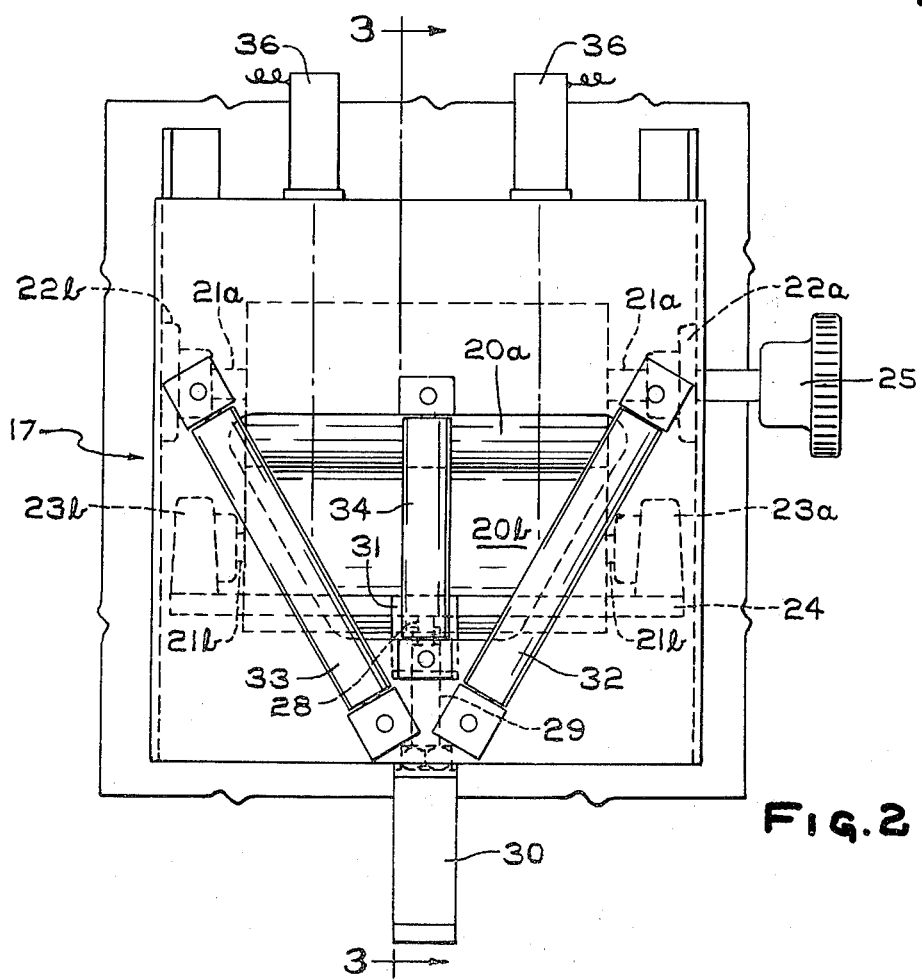
FIG. 2 is an enlarged front elevation view of the feeder device illustrated in FIG. 1 shown attached to the extruder of FIG. 1.

Referring to FIG. 1 of the drawings, strips 10 and 11 unvulcanized rubber composition are fed into screw-type extruder 12 through opening 13 in housing 14 of extruder 12 and are intermingled within the extruder 12 as they are advanced by the extruder screw (not shown) through extruder 12 to form an extrudate 15 discharged through extruder head 16.

To insure that strips 10 and 11 are fed simultaneously into extruder 12 at substantially the same linear rate, the strips 10 and 11 are fed through feeder device 17 which is attached to housing 14 of extruder 12 adjacent opening 13 by any convenient method (such as with bolts and nuts). Feeder device 17 is comprised of a housing 18 that contains a pair of opposed feed rolls 20a, 20b mounted respectively on shafts 21a, 21b. Shaft 21a is journaled in bearings (not shown) housed in journal boxes 22a, 22b mounted to housing 18 permitting feed roll 20a to rotate freely about its axis. Shaft 21b is journaled in bearings (not shown) housed in journal boxes 23a, 23b mounted to base plate 24 permitting feed roll 20b to rotate freely about its axis. A manual turn knob 25 secured to the end of shaft 21a allows feed roll 20a to be rotated manually to assist the operator hand-feeding the strips 10 and 11 into extruder 12 preparatory to start-up (as will be explained in greater detail hereafter). Base plate 24 at one end is supported by and pivots on support pivot bar 26 which is journaled in bearings (not shown) housed in journal boxes 27a, 27b. The opposite end of base plate 24 is supported by wheel 28 mounted for rotation about its axis to one end of piston rod 29 of a fluid-activated piston cylinder 30 attached to housing 18. A slotted guide 31 attached to base plate 24 and fitting around piston rod 29 restrains base plate 24 against excessive lateral movement. Base plate 24 provides a support for strips 10 and 11 as they are being advanced toward extruder 12 after they have passed between feed rolls 20a, 20b. A pair of guide rolls 32, 33 diverging from each other as they extend upwardly help to guide strips 10 and 11 into the bit between feed rolls 20a, 20b. Guide rolls 32, 33 each are journaled in bearings (not shown) housed within journal boxes attached to housing 18 permitting guide rolls 32, 33 to rotate freely about their respective axis. A vertical guide roll 34 positioned between guide rolls 32, 33 divides the V-shaped trough formed between and by guide rolls 32, 33 into two segments to maintain strips 10 and 11 separated from each other when being fed into feeder 17 until after they have been advanced beyond guide rolls 32, 33 and 34. Vertical guide roll 34 is journaled in bearings (not shown) housed within journal boxes attached to housing 18 permitting guide roll 34 to rotate freely about its axis. Photoelectric cells 36, 36 mounted in any convenient manner to housing 18 monitors the integrity of strips 10 and 11 and triggers an alarm system (not shown) if either of the strips 10 and 11 parts and no longer is being fed into feeder 17.

When the extruder 12 is not being operated, no pressurized fluid (air, for example) is being supplied to cylinder 30 and the piston is in the unactivated position allowing base plate 24 to pivot on pivot bar 26 to the depressed position shown in dot-and-dash lines in FIG. 3. In such position, feed rolls 20a, 20b are at their maximum separation from each other. When one desires to intermingle strips of rubber composition within extruder 12 in the manner described above, extruder 12 is operated in the customary manner. Strip 10 of rubber composition is threaded between guide rolls 33, 34 and between feed rolls 20a, 20b and strip 11 of rubber composition is threaded between guide rolls 32, 34 and between feed rolls 20a, 20b. The pressurized fluid can then be supplied to cylinder 30 moving the piston (not shown) and piston rod 29 upward which movement pivots base plate 24 about pivot bar 26 and causes feed roll 20b to move toward feed roll 20a. The pressure of the pressurized fluid needs to be sufficient so that, when feed roll 20b is moved toward feed roll 20a, feed rolls 20a, 20b grip strips 10 and 11 with sufficient force so that if either strip (10 or 11) is pulled forward into the extruder 12 the movement of the strip will cause feed rolls 20a, 20b to rotate on their axes and insure that the other strip is fed into the extruder 12 at essentially the same linear rate. A fluid pressure of 75 psi gage has been found to be quite adequate to maintain feed roll 20b resiliently urged toward feed roll 20a but inadequate to cause strips 10 and 11 to be cut through. After the feed roll 20b has been moved toward 20a through activation of the piston cylinder, the operator turns knob 25 to manually rotate feed roll 20a in the direction indicated by an arrow in FIG. 3. This action causes strips 10 and 11 to be fed through feeder device 17 and into extruder 12 through opening 13. Once strips 10 and 11 engage the extruder screw of the extruder 12 and become enmeshed in the flights of the extruder screw, strips 10 and 11 thereafter will be continually drawn into extruder 12 at a substantially uniform linear rate.

Desirably, the roll surface of at least one of the feed rolls 20a, 20b is grooved, fluted, knurled or otherwise roughened to enable feed rolls 20a, 20b to grip strips 10 and 11 more positively. In the embodiment shown in FIGS. 1-4, the roll surfaces of feed rolls 20a, 20b are grooved.

Feeder device 17 can be used whenever more than one strip of rubber composition are to be fed simultaneously into a screw-type extruder (for example, an AMF Orbitread unit). Through repositioning of guide rolls 32, 33 and 34 and the addition of one or more additional guide rolls, provision can be made for feeding more than two strips of rubber composition simultaneously into extruder 12.

It will be understood that the embodiment of this invention described above is susceptible of various modifications, changes and adaptations without departing from the spirit of the invention as defined in the appended claims.

I claim:

1. A feeder device adapted to be associated with a screw-type extruder for insuring that separate strips of unvulcanized rubber composition feed simultaneously through said feeder device and into said extruder at substantially the same linear rate, said feeder device comprising a pair of opposed feed rolls mounted to rotate freely about their respective axis, means for guiding said strips of rubber composition between the opposing faces of said feed rolls, and means for resiliently urging said feed rolls together whereby said feed rolls will positively grip said strips of rubber composition as said strips are advanced between said feed rolls.

2. The feeder device of claim 1 wherein at least one of the opposing faces of said feed rolls is roughened.

3. The feeder device of claim 1 wherein one of said feed rolls is mounted to a base plate which forms a supporting surface for said strips of rubber composition as they are advanced from said feeder rolls to said extruder, said base plate being pivotally mounted about a support bar at one end and being associated at its other end with means for resiliently urging the end of said base plate with said feeder roll mounted thereto toward the other said feeder roll.

4. The feeder device of claims 1, 2 or 3 having means for detecting when one of said strips of rubber composition no longer is being drawn between said feeder rolls.

* * * * *